E. MORRIS.
APPARATUS FOR WEIGHING THE CARGO OF VESSELS.
No. 11,676.  Patented Sept. 12, 1854.
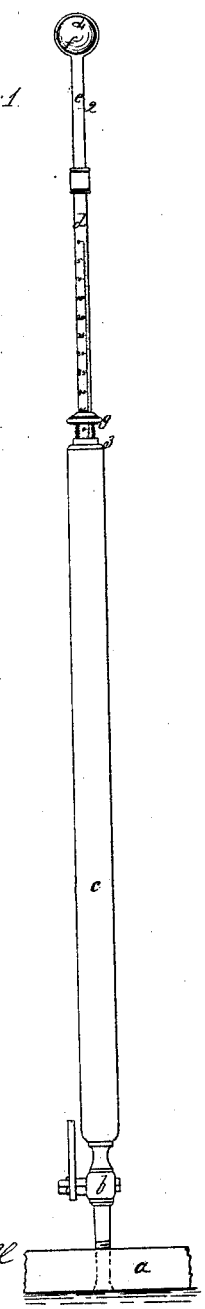
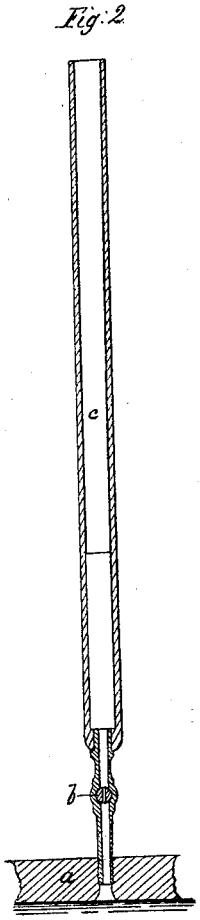
Witnesses:
Lemuel W. Snell
Thomas G. Harold
Inventor:
Ephm Morris

UNITED STATES PATENT OFFICE.

EPHRAIM MORRIS, OF SOUTH BERGEN, NEW JERSEY.

APPARATUS FOR DETERMINING THE WEIGHT OF CARGOES IN VESSELS.

Specification of Letters Patent No. 11,676, dated September 12, 1854.

*To all whom it may concern:*

Be it known that I, EPHRAIM MORRIS, of South Bergen, in the county of Hudson and State of New Jersey, have invented, made, and applied to use certain new and useful Improvements in Means for Weighing the Cargo in Canal-Boats and other Vessels; and I do hereby declare that the following is a full, clear, and exact description of the construction and operation of the same, reference being had to the annexed drawing, making part of this specification, wherein—

Figure 1, is an elevation of the apparatus complete; Fig. 2, is a vertical section of the pipe attached to the vessel; and Fig. 3, is a vertical section of the plunger and parts attached.

The like marks of reference denote the same parts in all the figures.

The nature of my said invention consists in so attaching a pipe in the vessel, that it shall be above the level of the water when the vessel is heavily laden, and of a sufficient length to include the water level when the vessel is empty. This pipe is provided with a cock at the bottom so as to shut in the water contained in the pipe when the vessel is at rest. The height of the water in the pipe being first determined by means of a plunger and glass tube in which the water rises to a given point, and then each additional number of tons of cargo placed in the vessel being marked on the rod of the plunger until the extreme burden of the vessel is attained, consequently one cargo weighed in becomes the standard, and the graduated rod denotes by inspection the exact weight of any other cargo that is afterward placed in the vessel.

$a$, denotes the bottom of the vessel, to which a pipe and cock $b$, is attached communicating with the exterior water, the pipe being nearly closed so as only to allow the water to pass in slowly.

$c$, is a vertical pipe attached to the cock and terminating as an open flat end at top; 3, is a movable thimble setting onto the upper end of the pipe and fitted to receive a screw socket $g$, through which a hollow rod $d$, passes terminating at the lower end as a plunger and cup leather 1, fitting tight to the inside of the pipe $c$; $e$, is a glass tube attached to the top of the hollow rod $d$, which is provided with a bulb $f$, and hole 4 on one side.

From the foregoing it will be understood that the method of using this instrument is as follows. When the vessel is stationary and not much agitated by waves the cock $b$, is shut off which confines the water at the precise level of that outside; the plunger and parts are then inserted, and the water is allowed to rise in the glass tube $e$, to a point denoted thereon as at 2, and in this position a mark is made on the rod $d$, above the screw socket $g$, and as each ton or number of tons is loaded into the vessel the same operation is repeated, of course the vessel drawing more water the marks on the rod commence at 0, and run down the rod until they indicate the extreme tonnage of the vessel. The pipe $c$, should be near the center of the vessel to be most accurate in operation.

A portion of the side of the screw socket $g$ is filed away, and the flat surface is graduated see Fig. 1. The use of this is, that suppose a new vessel be gaged as before detailed and consequent upon the saturation by water or other cause, she is not so buoyant in the course of time this screw socket can be turned up until the top thereof coincides with the 0, mark when the vessel is empty, and by keeping a record of the point to which the screw socket is thus raised out of the thimble, the tonnage can be determined as before, the screw socket being raised to the proper point to allow for the additional displacement of the vessel when empty.

In determining the weight of the cargo in canal boats where they are of one uniform size, each boat can be fitted with a pipe ($c$,) and the weigher being provided with the plunger and parts attached can weigh all the vessels therewith. In this case he will have to keep a record of the point to which the screw socket $g$, is raised for each boat, so that the top of the screw socket, coincides with 0, when the vessel is empty, to which point he must adjust the screw socket before ascertaining the level of the water and the consequent weight when the vessel is loaded. And if any article is in a vessel and a certain weight is to be put in additional the screw socket can be turned up to coincide with 0, before the cargo is put in, thereby the graduated rod will denote the weight added.

I am aware that a pipe has been used to determine, by means of the level of the water the tonnage of the vessel but in this case the pipe being open to the water outside, exposed the floating gage within to the motion of the waves and to friction against the sides of the pipe, to which the float and rod is always subject when the vessel is not on an even keel, thereby preventing an accurate measurement, but in my case the cock can be shut when the vessel is in still water even if the weighing be performed in rough water; and the measurement will be accurate whether the vessel be on an even keel or otherwise. And I am not aware of a plunger and glass tube having been used to ascertain the precise level of the water, by which means a very small variation in the position of the plunger causes considerable motion of the water in the tube consequent upon the difference of size of the tube and pipe, and were it not for the use of a glass bulb with a hole in the side the water would often be lost by being forced out from the end of the tube as the plunger descends.

What I desire to secure by Letters Patent is—

1. I claim determining the level of the water and the consequent weight of the cargo, by means of a plunger, hollow rod, glass tube and bulb, applied to the tube containing the water as specified.

2. I claim the adjustable socket $g$, with an index marked thereon, in combination with the hollow rod and plunger, whereby the apparatus is adapted to different boats of the same size or to the same boat under various circumstances as specified.

In testimony whereof I have hereunto set my signature this sixth day of February one thousand eight hundred and fifty four.

EPHRAIM MORRIS.

Witnesses:
LEMUEL W. SERRELL,
THOMAS G. HAROLD.